Figure 4:
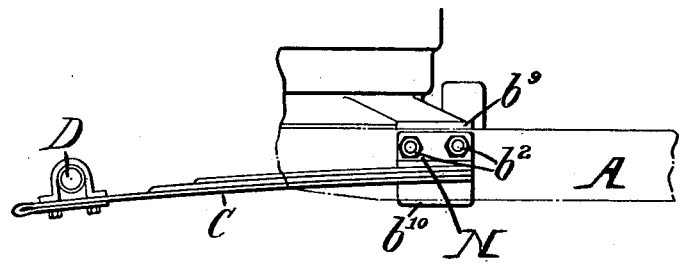

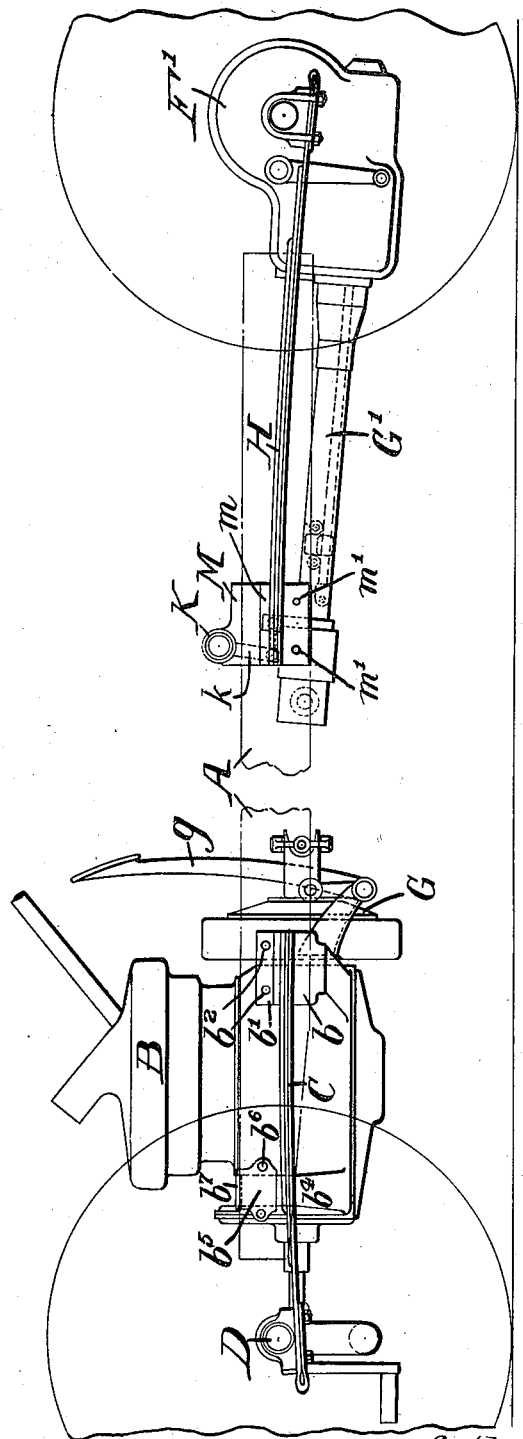

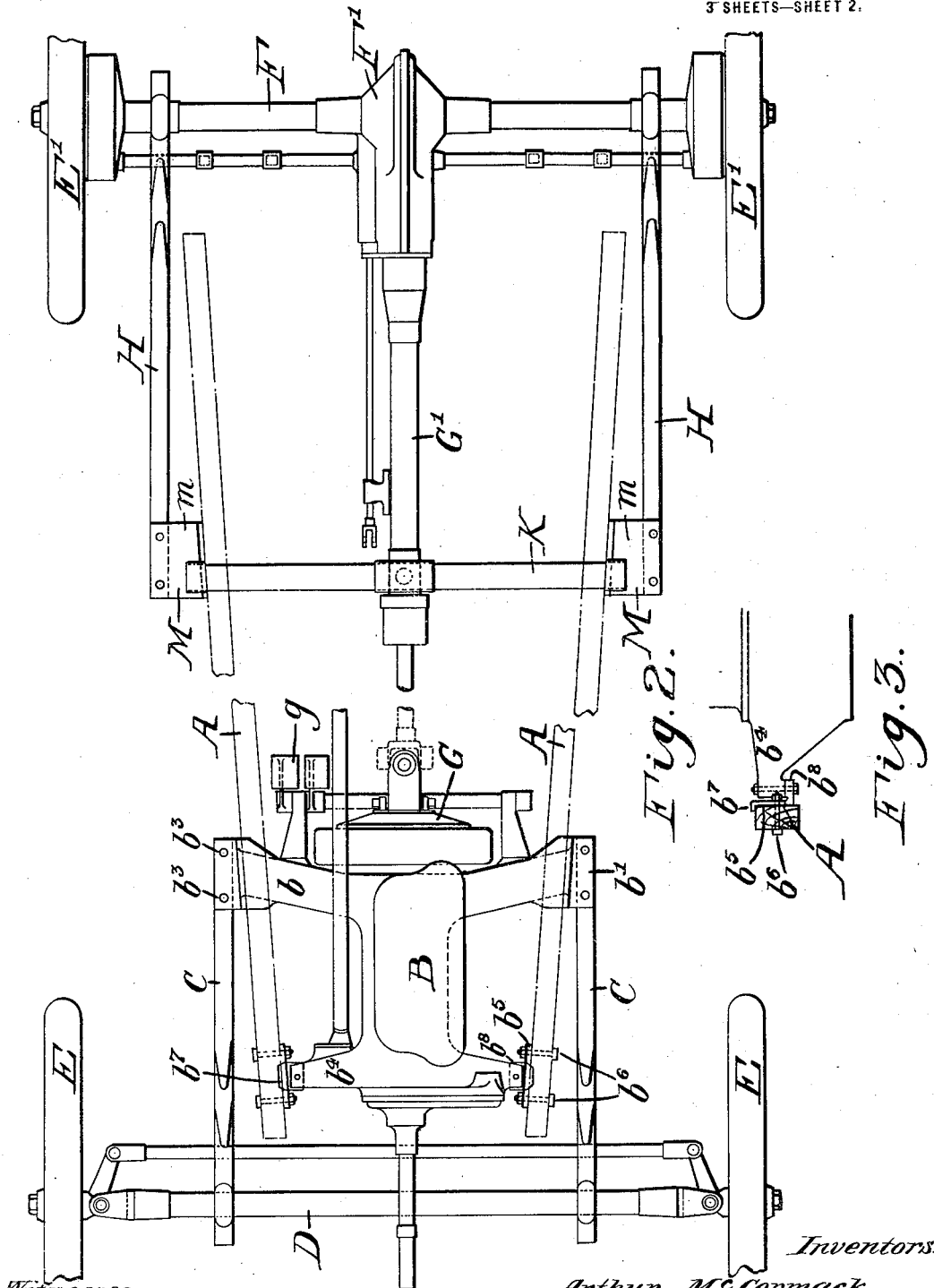

UNITED STATES PATENT OFFICE.

ARTHUR McCORMACK AND ALFRED ARNOLD REMINGTON, OF BIRMINGHAM, ENGLAND.

AUTOMOBILE-CHASSIS.

1,174,428.   Specification of Letters Patent.   Patented Mar. 7, 1916.

Application filed August 10, 1914. Serial No. 856,030.

*To all whom it may concern:*

Be it known that we, ARTHUR McCORMACK and ALFRED ARNOLD REMINGTON, both subjects of the King of Great Britain, and both residing at Birmingham, in the county of Warwick, England, and respectively managing director and chief engineer, have invented certain new and useful Improvements in Automobile-Chassis, of which the following is a specification.

This invention relates to the type of automobile chassis in which a rear live axle is driven from an engine which is in position near the front of the chassis, and, in respect of a portion of the invention, relates to that particular form of the said type of chassis in which the rear live axle is supported within a casing from whence a torque-and-thrust member projects which is universally connected with a transverse member of the frame. Hitherto, in this type of chassis, the main frame has constituted the means by which certain of the main portions of the mechanism such as the engine, the front springs, the front axle, the rear springs, and the rear axle, have been individually connected with one another, that is to say each of them has been independently connected with the frame. This has involved strains which have been liable under severe shocks to distort the frame; and the main object of this invention is to so connect the main portions of the mechanism as to avoid or greatly minimize the liability which has heretofore been experienced of the frame becoming distorted under severe shocks.

The above object is accomplished according to this invention by constructing the main portions of the mechanism as two units, namely, a front and a rear unit, which may be fixed as such to the main frame or to two side bars forming framing members, and detached as such, therefrom, or in lieu of forming the front portion of the mechanism as a unit removable as a whole, forming such unit as two portions and fixing them together at the same points of the frame or framing members and preferably by the same bolts.

The front unit comprises, as main features thereof, the engine with its fly-wheel and clutch, the front springs, and the front axle, the springs being fixed, either directly to the engine case, or, through the medium of suitable brackets, to the sides of the frame or to framing members, preferably, in the latter case, by the same bolts by which the engine or the rear portion thereof is fixed to the frame or framing members, and the springs are, preferably, of the cantaliver type. If the springs are fixed to the engine so as to be removable therewith, the whole of this mechanism is removed as a unit from the frame or framing members; and if the springs are fixed otherwise as described, then the engine with the parts which it carries is removed separately, and the springs with the front axle and road wheels, and the parts which are carried by the front axle, are removed together without separating them from one another. The rear portion of the engine is fixed to the frame or framing members in the same position therealong as are the springs, and thus the strain of the frame or framing members, ordinarily due to the fixing of the engine and springs thereto at different points, is avoided. The front of the engine is, however, for the sake of security, also fixed to the frame or framing members at points thereof which are forward of the points of fixture of the rear end of the engine and the springs thereto, but this involves no substantial strain upon the frame or framing members.

The rear unit comprises, as main features thereof, the rear axle and case which contains it, a torque member which is formed with, or is otherwise rigid with, the case, the rear springs, which also are conveniently of the cantaliver type, a transverse member, conveniently of tubular section, to which the springs are fixed, and connections between this transverse member and the torque member. The transverse member is adapted to be fixed to the frame or framing members, and forms the sole means of connection between the unit and the frame or framing members. The formation of the rear mechanism as an entire unit and its connection at a single position only in the length of the frame or framing members, avoids strain upon such frame or framing members, such as would result from fixing the rear mechanism thereto in two or more positions in the length thereof.

The change-speed gear, also, may constitute one of the features of either the rear or front unit, as may be preferred.

The wheel base can be readily varied in different vehicles (or in the same vehicle, if desired) by varying the positions of the front and rear units in relation to one another without requiring any alteration in the units themselves, but, of course, a Cardan shaft of suitable length must be used.

In the case of the front unit, the weight of the engine, which is supported almost entirely by the front axle, is transmitted direct to such axle through the medium of the front springs; and in the case of the rear unit the torque and forward thrust of the drive are transmitted entirely through the transverse member of the unit, and the weight of the rear part of the frame, and the weight which it carries, are transmitted direct from the transverse member of the unit to the rear axle through the medium of the rear springs. It will, therefore, be seen that substantially the sole function of the main frame or framing members is to distance apart the front and rear units and carry the body. Preferably, the pedal gear and also the starting handle are carried by the front unit.

While it is preferred to connect with the frame, in the manner above described, the main portions of the front mechanism as above defined, and also to connect with the frame, in the manner above described, the main portions of the rear mechanism as above defined, either the main portions of the front mechanism as above defined, or the main portions of the rear mechanism as above defined, may be connected with the frame in the manner described, independently of the construction or means of connection with the frame of the other of the said mechanisms.

In order that the invention may be clearly understood, and readily carried out in practice, we will now describe, first a convenient application thereof, which is illustrated by the drawings on Sheet 1 herewith, and then a modification of the front unit which is illustrated by the drawings on Sheet 3 herewith.

Figure 5:
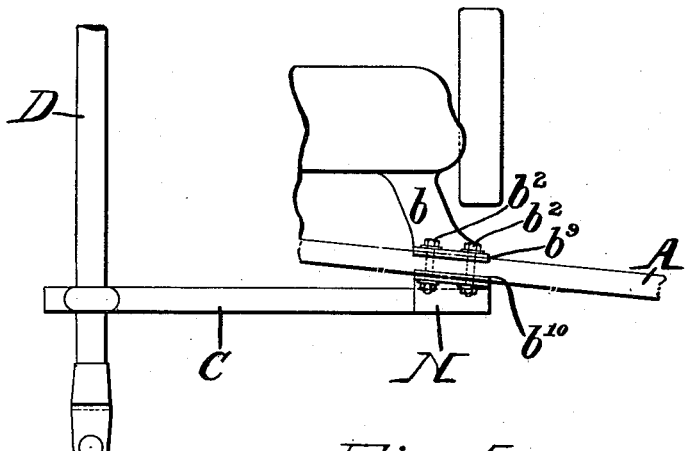

Of these drawings: Figure 1 is a side elevation of the chassis to which the invention is applied. Fig. 2 is a plan thereof. Fig. 3 is an elevation of one side of a portion of the forward end of the engine casing. Fig. 4 is a side elevation of the front unit, showing as much thereof as is necessary to illustrate the difference between it and the front unit illustrated by Figs. 1, 2 and 3, and; Fig. 5 is a part plan view of the unit shown by Fig. 4.

Referring first to the drawings on Sheet 1:—In the particular application shown by these drawings, two plain, straight, side-members A, conveniently of wood, take the place of the ordinary frame, and strictly speaking, form only a part of the frame, of which the other parts are formed by the front and back units when the same are fixed to the members A. These members are shown as having the middle portions thereof broken away, for convenience of illustration, and are shown by broken lines to enable all the exterior portions of the units of the mechanism, which do not come behind other portions thereof, to be clearly shown by full lines. The members A are shown to incline toward one another from their rear to their forward ends, thereby providing the width required at the rear, and the narrower width required between the steering wheels. The front unit consists of the engine B, the forward springs C, the front axle D, the steering road wheels E, and the clutch part G with the pedal $g$, and mechanism connected therewith, by which it is operated. The springs C are of the cantaliver type and are fixed each at its rear end to the underside of a ledge $b'$ which projects outward from a bracket $b$ of the rear end of the engine casing which passes under the corresponding framing bar A and up the outer side of such bar, to which it is fixed by bolts $b^2$. Each spring is fixed to the corresponding ledge $b'$ by bolts $b^3$. The forward end of the engine casing is fixed to the framing bars A by means of brackets $b^4$ of the casing, either directly or through the medium of intermediate brackets $b^5$ which are fixed against the inner faces of the members A by bolts $b^6$, these brackets $b^5$ having flanges $b^7$ to rest upon the tops of the members A, and flanges $b^8$ upon which the ends of the brackets $b^5$ are bolted. The axle D is fixed to the forward ends of the springs C in the manner shown. Thus, when the bolts $b^2$ and $b^6$ have been removed, the entire front unit consisting of the engine B, the springs C, the front axle D, and the clutch part G and mechanism by which it is operated, may be removed from the framing bars A without disconnecting any parts of the unit from one another. In lieu of removing the bolts $b^6$, the brackets $b^4$ of the engine casing may be simply unbolted from the brackets $b^5$, if these intermediate brackets are employed.

The rear unit consists of the dead-axle F which carries the live-axle, the rear road wheels E', the case F' containing the differential, the torque member G' which is rigid with the dead-axle, the rear springs H which, as shown, are of the cantaliver type, the transverse member K, of tubular section, and link $k$ which connects between the member K and the torque member. The transverse member K is rigidly fixed to brackets M, and the forward ends of the springs H are fixed against the undersides of ledges $m$ of these brackets, and the brackets themselves are fixed by means of bolts $m'$ against the outer sides of the framing members A. Thus, when the bolts $m'$ have been withdrawn, the entire unit consisting of the dead-axle F, torque member G', springs H and transverse member K, may be removed without removing any parts of the unit from one another.

Referring now to the drawings on Sheet 3, which illustrate a modification of the front unit:—The only substantial difference between this modification and that shown by Figs. 1, 2 and 3, is that the springs C, instead of being fixed at their rear ends to a bracket of the engine casing, are each fixed to an independent bracket N which is bolted against the outer side of the corresponding framing member A while the bracket $b$ of the engine casing is fixed against the inner side of the framing member A, these two brackets being fixed to the framing member by bolts $b^2$ which pass through flanges of both the brackets and through the framing member. Each bracket $b$ of the engine casing is formed with a flange $b^9$ which lies upon the top of the corresponding framing member A, and each bracket N is formed with a flange $b^{10}$ which comes under the corresponding framing member A. Thus, when the bolts $b^2$ have been withdrawn, and the front end of the engine casing has been disconnected from the framing members A, the engine casing and the parts which it carries, may be removed, and also, separately therefrom, the brackets N with the springs C and front axle D.

Having fully described our invention, what we claim and desire to secure by Letters Patent, is:—

1. The combination, in an automobile chassis, of an engine, a fly-wheel and clutch, a front axle, and springs which support the front of the chassis from the axle, all constituting a unitary structure removable as a whole, from the frame, a rear live-axle, a case which contains the live-axle, a torque member which is rigid with the case, a transverse member of the frame with which the forward end of the torque member is universally jointed, and springs which support the rear end of the frame from the rear axle, all constituting a unitary structure removable as a whole from the frame, and means by which the live-axle is driven from the engine.

2. The combination, in an automobile chassis, of an engine whereof the case is fixed to the frame, a fly-wheel and clutch, a front axle and springs which support the front of the chassis from the axle and are fixed at their inner ends to the frame in the same position lengthwise thereof as is the rear end of the engine case, and a rear live-axle, a case which contains the live-axle, a torque member which is rigid with the case, a transverse member of the frame with which the forward end of the torque member is universally jointed, and springs which support the rear end of the frame from the axle, said live-axle, torque member, transverse member, and springs constituting a unitary structure removable as a whole from the frame.

3. In an automobile chassis, an engine, a fly-wheel and clutch, a front axle, and springs which support the front of the chassis from the axle, said parts constituting a unitary structure removable as a whole from the frame, a rear axle, and intermediate mechanism between said engine and rear axle by which the rear axle is driven from said engine.

4. In an automobile chassis, an engine of which the axis of the crank-shaft runs longitudinally of the chassis and which is fixed to the side frames of the chassis at its forward and rear ends, a front axle, and cantaliver springs which at their forward ends are connected with said front axle and at their rear ends are fixed to the frame in the same position lengthwise thereof as the connection therewith of the rear end of the engine.

5. In an automobile chassis, a rear live-axle, a case which contains the live-axle, a torque member which is rigid with the case, a transverse member of the frame with which the forward end of the torque member is universally jointed, and cantaliver springs which are connected at their rear ends with the axle and are rigidly connected at their forward ends with the said transverse member constituting a unitary structure removable as a whole from the frame, the said springs being permanently fixed to the said transverse member and remaining fixed thereto when said unitary structure of which they form a part has been removed from the frame.

6. In an automobile chassis, a rear live-axle, a case which contains the live-axle, a torque member which is rigid with the case, a transverse member of the frame with which the forward end of the torque member is universally jointed, change-speed mechanism, and springs which support the rear end of the frame from the rear axle, all forming members of a unit which is removable, as such, from the frame, the said springs being permanently fixed to the said transverse member and remaining fixed thereto when the unit of which they form a part has been removed from the frame.

7. In an automobile chassis, an engine of which the axis of the crank-shaft runs longitudinally of the chassis and which is fixed to the side frames of the chassis both at its forward and rear ends, a fly-wheel and clutch which are carried by the engine case, a front axle and cantaliver springs which at their forward ends are connected with said front axle and at their rear ends are fixed to the frame in the same position lengthwise thereof as the connection therewith of the rear end of the engine.

In witness whereof we have hereunto signed our names this 29th day of July, 1914, in the presence of two subscribing witnesses.

ARTHUR McCORMACK.
ALFRED ARNOLD REMINGTON.

Witnesses:
ERNEST HARKER,
ROBERT G. GROVES.